(12) United States Patent
Jang et al.

(10) Patent No.: US 11,050,301 B2
(45) Date of Patent: Jun. 29, 2021

(54) DETERMINATION METHOD OF MAGNETIC RESONANT CONDITION FOR MULTI-DEVICE WIRELESS POWER TRANSFER SYSTEMS

(71) Applicant: Korea Advanced Institute of Science and Technology, Daejeon (KR)

(72) Inventors: InGwun Jang, Daejeon (KR); Mingi Kim, Daejeon (KR); Seung Beop Lee, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 16/509,419

(22) Filed: Jul. 11, 2019

(65) Prior Publication Data

US 2020/0177033 A1    Jun. 4, 2020

(30) Foreign Application Priority Data

Nov. 29, 2018    (KR) ........................ 10-2018-0150531

(51) Int. Cl.
*H02J 50/80*    (2016.01)
*H02J 50/10*    (2016.01)
(Continued)

(52) U.S. Cl.
CPC ............ *H02J 50/80* (2016.02); *H02J 7/0047* (2013.01); *H02J 7/025* (2013.01); *H02J 50/10* (2016.02); *H02J 7/0048* (2020.01); *H02J 7/0049* (2020.01)

(58) Field of Classification Search
CPC .. H02J 50/80; H02J 50/10; H02J 50/12; H02J 50/14; H02J 50/90; H02J 7/00; H02J 7/02;
(Continued)

(56) References Cited

U.S. PATENT DOCUMENTS

| | | | |
|---|---|---|---|
| 2012/0169137 A1* | 7/2012 | Lisi | H02J 50/40 307/104 |
| 2014/0111153 A1* | 4/2014 | Kwon | H02J 50/40 320/108 |

(Continued)

FOREIGN PATENT DOCUMENTS

| | | |
|---|---|---|
| CN | 106037269 B | 10/2018 |
| JP | 2017-005992 A | 1/2017 |

(Continued)

OTHER PUBLICATIONS

Duong et al.; "Maximum efficiency formulation for inductive power transfer with multiple receivers"; IEICE Electronics Express; vol. 13; 2016; 10 pages.
(Continued)

*Primary Examiner* — Nguyen Tran
*Assistant Examiner* — Jagdeep S Dhillon
(74) *Attorney, Agent, or Firm* — BakerHostetler

(57) ABSTRACT

Disclosed is a method of determining a magnetic resonant condition for a multi-device wireless power transfer system. A magnetic resonant condition determining method may determine a resonant condition based on a charge state, for example, a number of charging devices and a relative position between charging devices, for a multi-transmitter/receiver of a wireless power transfer system.

15 Claims, 24 Drawing Sheets

(51) Int. Cl.
*H02J 7/00* (2006.01)
*H02J 7/02* (2016.01)

(58) Field of Classification Search
CPC .......... H02J 7/025; H02J 7/027; H02J 7/0029; H02J 5/005; H04B 5/0037; H04W 52/02; H04W 52/0245; H01F 38/14
USPC ............. 307/104, 149, 66, 43, 9.1, 10.1, 38; 320/105, 110, 108; 455/102, 571, 573
See application file for complete search history.

(56) References Cited

U.S. PATENT DOCUMENTS

| | | | | |
|---|---|---|---|---|
| 2014/0113689 A1* | 4/2014 | Lee | ........................ | H01M 10/44 |
| | | | | 455/573 |
| 2014/0253028 A1* | 9/2014 | Lee | ......................... | H02J 50/70 |
| | | | | 320/108 |
| 2015/0207333 A1* | 7/2015 | Baarman | ................. | H02J 50/12 |
| | | | | 307/104 |
| 2016/0191121 A1* | 6/2016 | Bell | ..................... | H02J 7/00045 |
| | | | | 307/104 |
| 2016/0336804 A1* | 11/2016 | Son | ......................... | H02J 50/12 |
| 2017/0025903 A1* | 1/2017 | Song | ........................ | H02J 50/40 |
| 2017/0338685 A1* | 11/2017 | Jung | ...................... | H02J 7/0021 |
| 2017/0366232 A1* | 12/2017 | Lee | ......................... | H02J 50/60 |
| 2018/0097403 A1* | 4/2018 | Jung | ...................... | H02J 50/80 |
| 2018/0309314 A1* | 10/2018 | White, II | ................ | H02J 50/40 |
| 2020/0204009 A1* | 6/2020 | Park | ........................ | H02J 50/80 |

FOREIGN PATENT DOCUMENTS

| | | |
|---|---|---|
| KR | 10-2013-0071764 A | 7/2013 |
| KR | 2014-0114924 A | 9/2014 |
| WO | WO 2013/176751 A1 | 11/2013 |

OTHER PUBLICATIONS

European Patent Application No. 19185238.3; Extended Search Report; dated Dec. 6, 2019; 8 pages.

* cited by examiner

Before changing position and angle

| Rx | Center position |
|---|---|
| ①: $(x^{r_1}, y^{r_1}, G) =$ | $(0.0, -55.0, 10.0)$ |
| ②: $(x^{r_2}, y^{r_2}, G) =$ | $(0.0, 0.5, 10.0)$ |
| ③: $(x^{r_3}, y^{r_3}, G) =$ | $(0.0, 60.6, 10.0)$ |

After changing position and angle

| Rx | Center position | Angle |
|---|---|---|
| ①: $(x^{r_1}, y^{r_1}, G) = (-25.0, 0.0, 10.0)$ | | $\theta^{r_1} = 30.0$ ° |
| ②: $(x^{r_2}, y^{r_2}, G) = (-35.0, -60.0\ 10.0)$ | | $\theta^{r_2} = 20.0$ ° |
| ③: $(x^{r_3}, y^{r_3}, G) = (35.0, 50.0, 10.0)$ | | $\theta^{r_3} = -30.0$ ° |

DETERMINATION METHOD OF MAGNETIC RESONANT CONDITION FOR MULTI-DEVICE WIRELESS POWER TRANSFER SYSTEMS

CROSS-REFERENCE TO RELATED APPLICATION

This application claims the priority benefit of Korean Patent Application No. 10-2018-0150531, filed on Nov. 29, 2018, in the Korean Intellectual Property Office, the disclosure of which is incorporated herein by reference.

BACKGROUND

1. Field of the Invention

The following description of example embodiments relates to a method of determining a magnetic resonant condition for a multi-device wireless power transfer system.

2. Description of the Related Art

Wireless power transfer refers to a noncontact power transfer technique in which electric energy supplied to a primary coil, for example, a transmitter, induces magnetic field energy and the induced magnetic field energy induces the electric energy again in a secondary coil, for example, a receiver. Research on the wireless power transfer has been actively conducted since the publication of the paper by MIT professor Soljacic in 2006. The wireless power transfer has been applied to a wide range of products ranging from low-power portable electronic devices to high-power train systems. Currently, the scale of related market is growing rapidly and is predicted to reach about 14 billion dollars by 2024.

Nonradiative wireless power transfer is classified into a magnetic induction type and a magnetic resonance type.

In the case of the magnetic induction type wireless power transfer, power may be effectively supplied to a secondary coil from the primary coil through a strong coupling effect between a primary coil, for example, a transmitter, and the secondary coil, for example, a receiver. For example, a wireless charging apparatus of magnetic induction type is disclosed in Korean Patent Laid-Open Publication No. 10-2013-0071764. Here, since an airgap between a transmitting coil and a receiving coil is significantly limited, for example, around about several millimeters, a power transfer efficiency significantly drops in response to an increase in the airgap between the transmitting coil and the receiving coil or occurrence of misalignment between coils.

In the case of the magnetic resonance type wireless power transfer, a power transfer efficiency may be enhanced by maximizing a coupling effect through a magnetic resonance effect although a coupling state between transmitting and receiving coils is loose, for example, although an airgap therebetween is large.

Currently, commercialization of the magnetic induction type is ongoing based on small electronic products, for example, mobile phones, earphones, and tablet personal computers (PCs), and the magnetic resonance type applies to products, for example, vehicles, large home appliances, and motors, which require a large airgap and great power.

With its high convenience and stability compared to wired power transfer technology, wireless power transfer technology is widely adopted to products ranging from small home appliances using small power to products using large power, such as electric vehicles. A large number of products have been already released. However, there is a great need to develop wireless power transfer technology or product capable of simultaneously charging a plurality of devices having different rated power and having a high degree of freedom for a transmission distance. According to the trend of wireless power transfer standardization of International Telecommunication Union Telecommunication Standardization Sector (ITU-T), a service for simultaneously charging a plurality of terminals is selected as a representative example of applying the wireless power transfer. In the case of the magnetic induction type, there are many examples of commercialization, however, there is a limit to increase a transmission distance. In the case of the magnetic resonance type, a relatively high power transfer efficiency may be secured even in a relatively long transmission distance through a resonance phenomenon, however, the power transfer efficiency varies greatly depending on whether a resonant condition is met.

In particular, a resonant condition for a single transmitter/receiver may derive a mathematical theory, however, a resonant condition for a multi-transmitter/receiver may not derive a mathematical theory due to a mutual coupling effect between a plurality of coils and different rated power required by an individual receiver. Also, in response to a change in a configuration of a multi-transmitter/receiver system, for example, a number of transmitters/receivers, a charge capacity of a receiver, a relative position between a transmitter and a receiver, and a magnetic characteristic between a transmitter and a receiver, the mutual coupling effect may vary, which leads to changing the resonant condition. In the case of the magnetic resonance type, unless the resonant condition is met, the power transfer efficiency drops sharply. Accordingly, if the system change occurs, resonance compensation needs to be performed by reflecting the system change.

SUMMARY

At least one example embodiment provides a magnetic resonant condition determining method that may determine a resonant condition based on a charge state, for example, a number of charging devices and a relative position between charging devices, for a multi-transmitter/receiver of a wireless power transfer system, a computer apparatus performing the magnetic resonant condition determining method, a computer program stored in a non-transitory computer-readable recording medium to perform the magnetic resonant condition determining method on the computer apparatus in conjunction with the computer apparatus, and the non-transitory computer-readable recording medium.

At least one example embodiment also provides a magnetic resonant condition determining method that may support a wireless power transfer system to stably and efficiently transfer wireless power by determining a new resonant condition in response to a change in a resonant condition, such as a change of a charge state, for example, a number of charging devices and a relative position between charging devices, for a multi-transmitter/receiver of the wireless power transfer system, and by performing a resonance compensation through application of the determined new resonant condition, a computer apparatus performing the magnetic resonant condition determining method, a computer program stored in a non-transitory computer-readable recording medium to perform the magnetic resonant condition determining method on the computer apparatus in conjunction with the computer apparatus, and the non-transitory computer-readable recording medium.

According to an aspect of at least one example embodiment, there is provided a method of determining a magnetic resonant condition for a wireless power transfer system capable of performing a wireless power transfer using at least two receivers, the method including determining an initial charge state for at least one transmitter and the at least two receivers of the wireless power transfer system; and determining a resonant condition with varying at least one design variable in the wireless power transfer system by a preset magnitude in the initial charge state.

The resonant condition may include a value of the at least one design variable that maximizes a power transfer efficiency with satisfying a charge capacity of each of the at least two receivers, and the at least one design variable may include at least one parameter among an operating frequency, a compensation capacitance, and an input voltage.

The magnetic resonant condition determining method may further include providing the determined resonant condition to the wireless power transfer system such that the determined resonant condition is applied to the wireless power transfer system.

The magnetic resonant condition determining method may further include detecting a state change from the initial charge state to another charge state due to a change of operating conditions; and redetermining the resonant condition with varying at least one of an operating frequency, a compensation capacitance, and an input voltage by the preset magnitude as the at least one design variable in the wireless power transfer system, in the other charge state.

The detecting of the state change may include detecting a change in at least one of a number of transmitters of the wireless power transfer system, a number of receivers that are supplied with wireless power through the wireless power transfer system, a charge capacity of a receiver, a relative position between a transmitter and a receiver, and an orientation angle of a receiver being charged.

The change may be detected based on an output value of a sensor included in the wireless power transfer system.

The magnetic resonant condition determining method may further include providing the redetermined resonant condition to the wireless power transfer system such that the redetermined resonant condition is applied to the wireless power transfer system for compensation.

Each of the at least two receivers may be a charging device configured to be supplied with wireless power from the wireless power transfer system and separate from the wireless power transfer system.

According to an aspect of at least one example embodiment, there is provided a computer program stored in a non-transitory computer-readable recording medium to perform the magnetic resonant condition determining method on a computer apparatus in conjunction with the computer apparatus.

According to an aspect of at least one example embodiment, there is provided a non-transitory computer-readable recording medium storing instructions that, when executed by a processor, cause the processor to perform the magnetic resonant condition determining method.

According to an aspect of at least one example embodiment, there is provided a computer apparatus that performs a method of determining a magnetic resonant condition for a wireless power transfer system capable of performing a wireless power transfer using at least two receivers, the computer apparatus including at least one processor configured to execute a computer-readable instruction on the computer apparatus. The at least one processor is configured to determine an initial charge state for at least one transmitter and the at least two receivers of the wireless power transfer system, and to determine a resonant condition with varying at least one design variable in the wireless power transfer system by a preset magnitude in the initial charge state.

According to some example embodiments, it is possible to determine a resonant condition based on a charge state, for example, a number of charging devices and a relative position between charging devices, for a multi-transmitter/receiver of a wireless power transfer system.

Also, according to some example embodiments, it is possible to support a wireless power transfer system to stably and efficiently transfer wireless power by determining a new resonant condition in response to a change in a resonant condition, such as a change of a charge state, for example, a number of charging devices and a relative position between charging devices, for a multi-transmitter/receiver of the wireless power transfer system, and by performing a resonance compensation through application of the determined new resonant condition.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
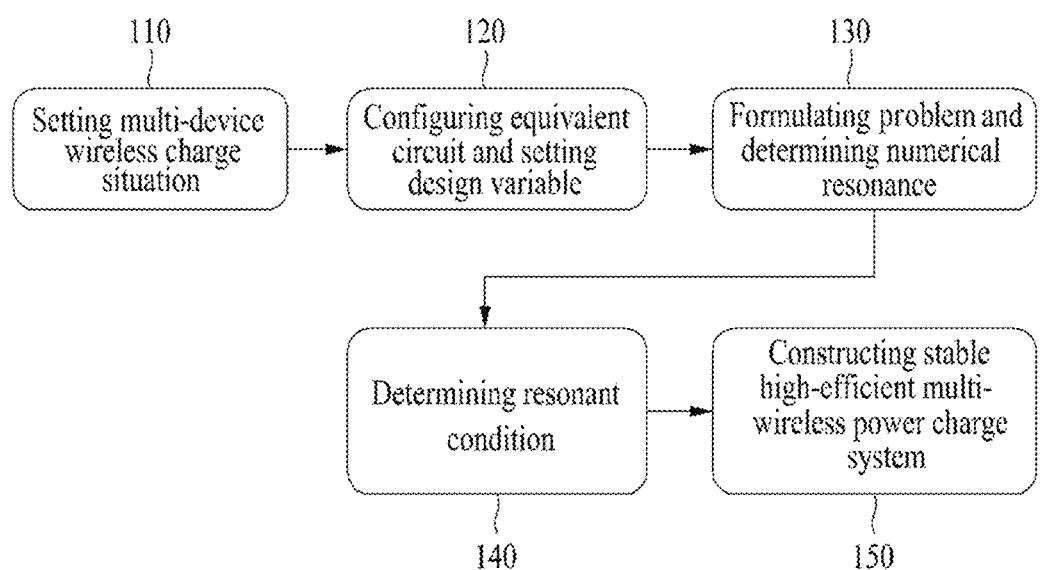
FIG. 1 illustrates an example of a process of constructing a wireless power transfer system using a magnetic resonant condition determining method according to an example embodiment.

One or more example embodiments will be described with reference to the accompanying drawings. Advantages and features of the example embodiments, and methods for achieving the same may become explicit by referring to the accompanying drawings and the following example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

When an element or a layer is referred to as being "on," "connected to," "co upled to," or "adjacent to," another element or layer, the element or the layer may be directly on, connected to, coupled to, or adjacent to, the other element or layer, or one or more other intervening elements or layers may be present. In contrast, when an element or a layer is referred to as being "directly on," "directly connected to," "directly coupled to," or "immediately adjacent to," another element or layer, there are no intervening elements or layers present.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Hereinafter, example embodiments will be described with reference to the accompanying drawings.

The example embodiments relate to a magnetic resonant condition determining method that may determine a resonant condition of a multi-transmitter/receiver wireless power transfer system and may use the determined resonant condition for a resonant condition setting, a computer apparatus performing the magnetic resonant condition determining method, a computer program stored in a non-transitory computer-readable recording medium to perform the magnetic resonant condition determining method on the computer apparatus in conjunction with the computer apparatus, and the non-transitory computer-readable recording medium.

For example, the magnetic resonant condition determining method according to the example embodiments may be performed by at least one computer apparatus, which is described below. Here, a computer program according an example embodiment may be installed and executed on the computer apparatus and the computer apparatus may perform the magnetic resonant condition determining method according to the example embodiments under control of the executed computer program. The computer program may be stored in a non-transitory computer-readable medium to perform the magnetic resonant condition determining method on the computer apparatus in conjunction with the computer apparatus.

Here, the computer apparatus performing the magnetic resonant condition determining method may be included in the multi-transmitter/receiver wireless power transfer system or may be connected to the multi-transmitter/receiver wireless power transfer system over a network as an apparatus separate from the multi-transmitter/receiver wireless power transfer system.

Here, the resonant condition of the multi-transmitter/receiver wireless power transfer may refer to a state in which a charge capacity of an individual charging device is satisfied and a power transfer efficiency is maximized. Also, the expression "multi-transmitter/receiver" describes that any one of a number of transmitters and a number of receivers is two or more.

FIG. 1 illustrates an example of a process of constructing a wireless power transfer system using a magnetic resonant condition determining method according to an example embodiment. FIG. 1 illustrates a first process 110 for setting a multi-device wireless charge situation, a second process 120 for configuring an equivalent circuit and setting a design variable, a third process 130 for formulating a problem and determining a numerical resonance, a fourth process 140 for determining a resonant condition, and a fifth process 150 for constructing a stable high-efficient multi-device wireless power charge system.

Determination of a Resonant Condition Based on an Individual Charge Condition of a Multi-Device Magnetic resonance type wireless power transfer technology including a single transmitter/receiver may determine a resonant condition through a compensation combination of a coil inductance and a capacitance on a closed circuit of the transmitter/receiver and may maximize a power transfer efficiency accordingly.

For example, a resonant condition for a single transmitter/receiver may be induced as represented by the following Equation 1 through a combination of an operating frequency (f) on a closed circuit of the transmitter/receiver, an inductance (L) of the transmitter/receiver, and a compensation capacitance (C).

$$2\pi f = \frac{1}{\sqrt{CL}} \qquad \text{[Equation 1]}$$

With respect to the operating frequency (f), in response to occurrence of a change in a distance between the transmitter and the receiver or an angle of the receiver, the resonant condition may be matched by varying an input frequency. In the case of a medical device that operates inside a human body, a magnetic characteristic between the transmitter and the receiver may vary due to a change in tissue cell and a change in blood flow, such as contraction or relaxation of blood vessel, which may lead to degrading the power transfer efficiency. Here, the power transfer efficiency may be compensated for by varying the input frequency.

With respect to the inductance (L) of the transmitter/receiver, in the case of a system having a resonator between the transmitter and the receiver, an inductance value at an individual transmitter/receiver may be adjusted by adjusting a position of the resonator, which may lead to achieving the optimal efficiency.

With respect to the compensation capacitance (C), if it is difficult to vary the operating frequency (f) or the inductance (L) due to a fixed frequency by various types of rules or a complexity of an inductance change system, it is possible to enhance the power transfer efficiency by changing the capacitance using a variable capacitor.

Here, the enhancement of power transfer efficiency through control of the operating frequency (f), the inductance (L) of the transmitter/receiver, and the compensation capacitance (C) corresponds to a research result at the magnetic resonance type wireless power transfer system including the single transmitter/receiver and thus, may not be directly applied to resonant condition determination and compensation of a magnetic resonance type wireless power transfer system including a multi-transmitter/receiver.

In the case of magnetic resonance type wires power transfer technology including a multi-transmitter/receiver, required rated current needs to flow in a circuit of an individual receiver for stable charging and a current phase difference of an individual transmitter/receiver needs to be considered due to a coupling effect between multi-transmitter and receiver. Accordingly, if maximization of the power transfer efficiency and the rated power of an individual receiver are all considered with respect to resonance determination of a multi-transmitter/receiver, a difficulty and a complexity in the resonance determination may significantly increase according to an increase in the number of receivers. According to example embodiments, it is possible to effectively determine a resonant condition for a multi-transmitter/receiver through a numerical method, such as an optimal design theory, instead of using a mathematical approach method. For example, when rated power of an individual receiver and a coil design of a transmitter/receiver and a relative position between a transmitter and a receiver are determined, an available design variable for the optimal design may be a capacitance (C) of a transmitter/receiver and an input voltage ($V_t$) of a transmitter.

Figure 2:
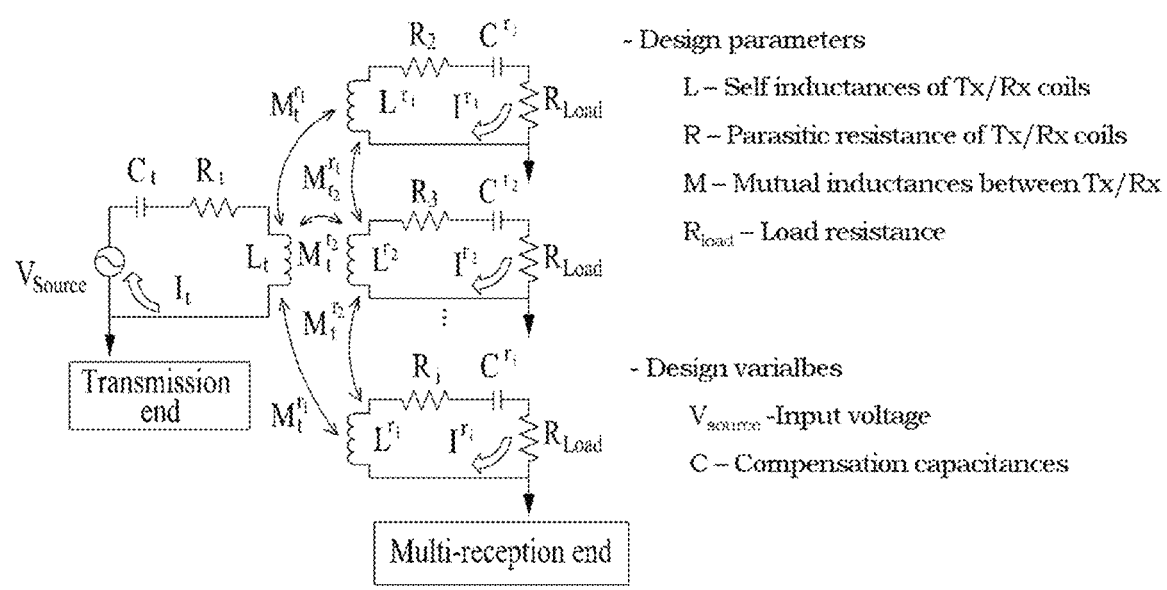
FIG. 2 illustrates an example of an equivalent circuit configuration and a design variable setting according to an example embodiment.
Figure 3:
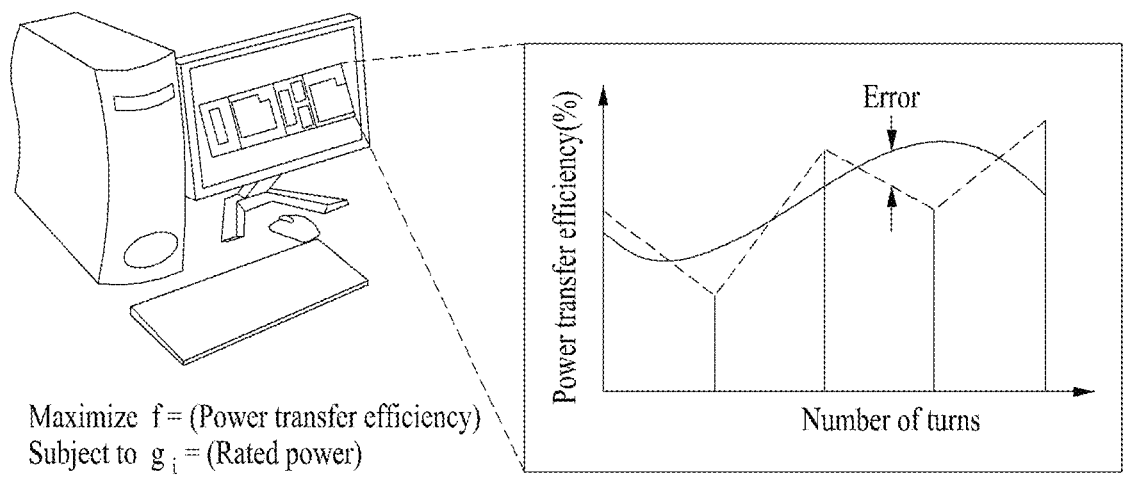
FIG. 3 illustrates an example of a problem formulation and a numerical resonance determination according to an example embodiment.
Figure 4A:
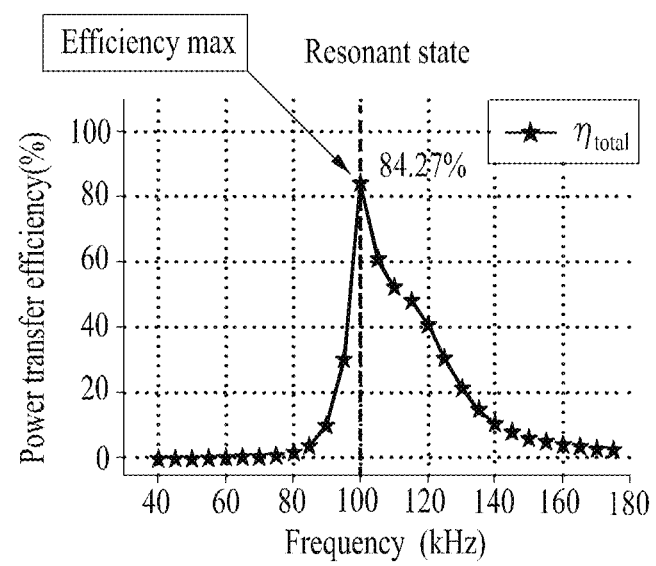
FIGS. 4A and 4B illustrate examples of determining a resonant condition according to an example embodiment.
Figure 4B:
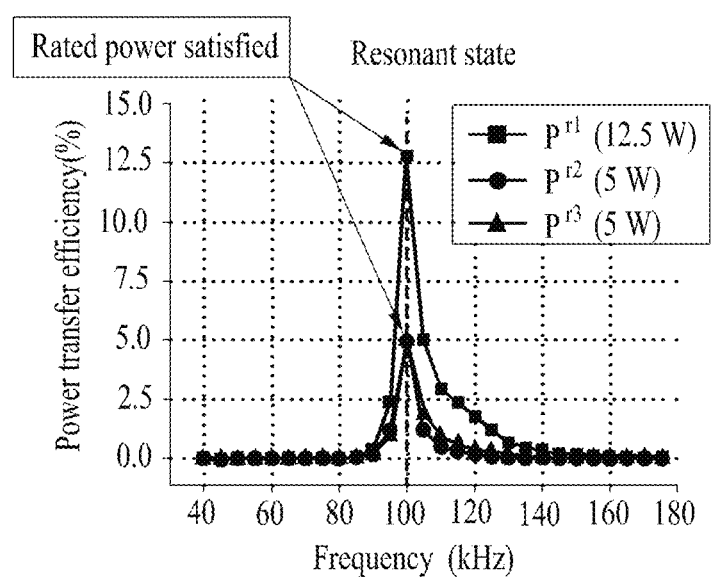

FIG. 2 illustrates an example of an equivalent circuit configuration and a design variable setting according to an example embodiment, FIG. 3 illustrates an example of a problem formulation and a numerical resonance determination according to an example embodiment, and FIGS. 4A and 4B illustrate examples of determining a resonant condition according to an example embodiment.

Example embodiment of applying technology for determining a resonant condition for a multi-transmitter/receiver As described above, a resonant condition for a single transmitter/receiver may derive a mathematical theory.

Figure 5:
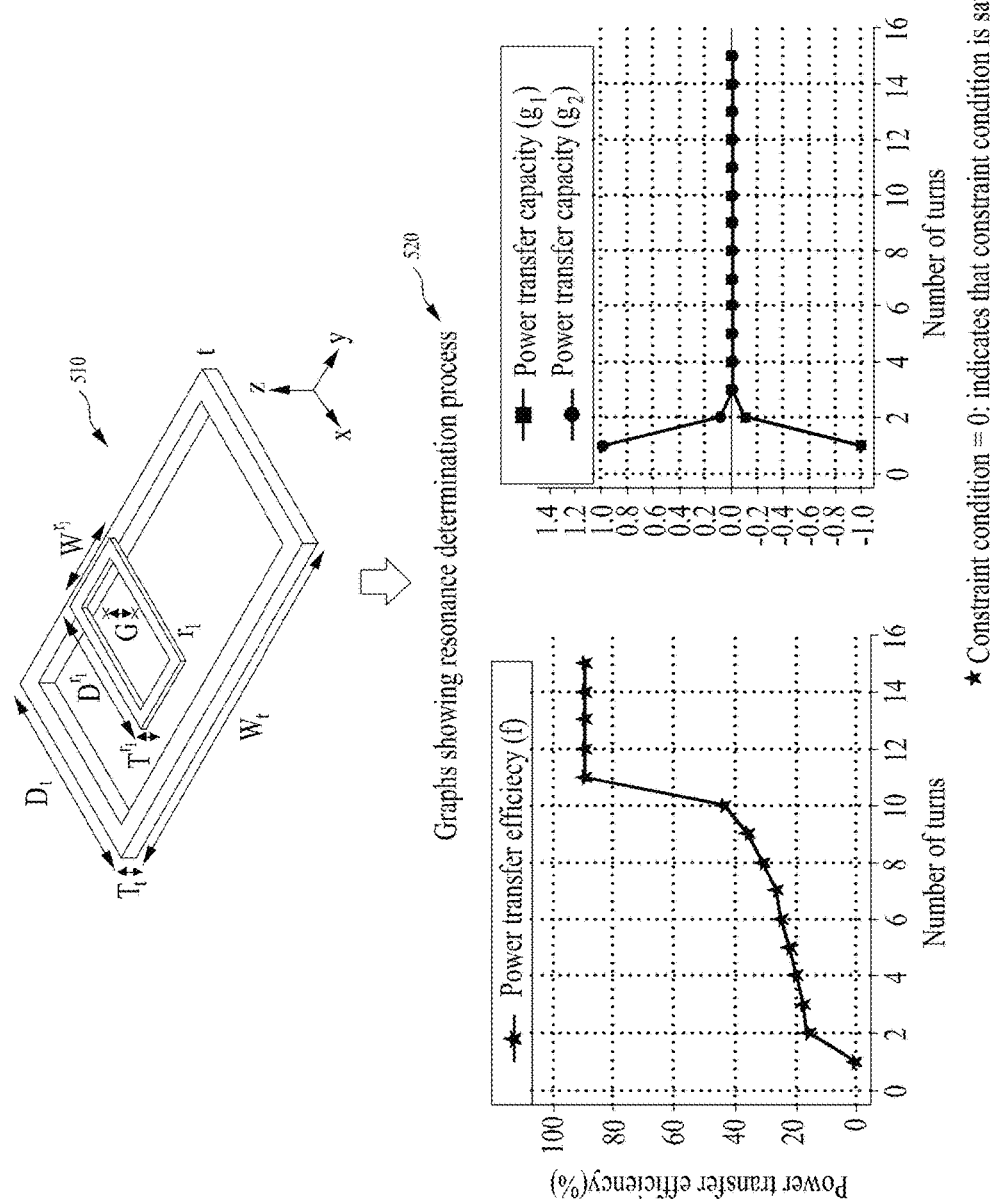
FIG. 5 illustrates an example of determining a resonant condition for a single transmitter/receiver wireless power transfer system according to an example embodiment.

FIG. 5 illustrates an example of determining a resonant condition for a single transmitter/receiver wireless power transfer system according to an example embodiment. FIG. 5 illustrates a single transmitter/receiver wireless power transfer system 510 and graphs 520 showing a resonance determination process for the single transmitter/receiver wireless power transfer system 510. Here, the following Table 1 shows that a mathematical theory about a resonant condition, i.e., a "resonant condition theoretical value" and a "resonance determination result value" acquired using a magnetic resonant condition determining method according to an example embodiment are almost identical to each other.

TABLE 1

| | | resonant condition theoretical value | resonance determination result value | error rate (%) |
|---|---|---|---|---|
| design variable | transmitter capacitance $C_t$ (nF) | 10.2 | 10.19 | 0.10 |
| | receiver capacitance $C^{r1}$ (nF) | 45.27 | 45.82 | 1.21 |
| | input voltage $V_t$ (nF) | 16.77 | 16.91 | 0.83 |
| system performance | receiver rated power $P^{r1}$ (W) | 12.50 | 12.59 | 0.72 |
| | transmitter capacitance $\eta_{total}$ (%) | 90.10 | 89.57 | 0.59 |

Figure 6:
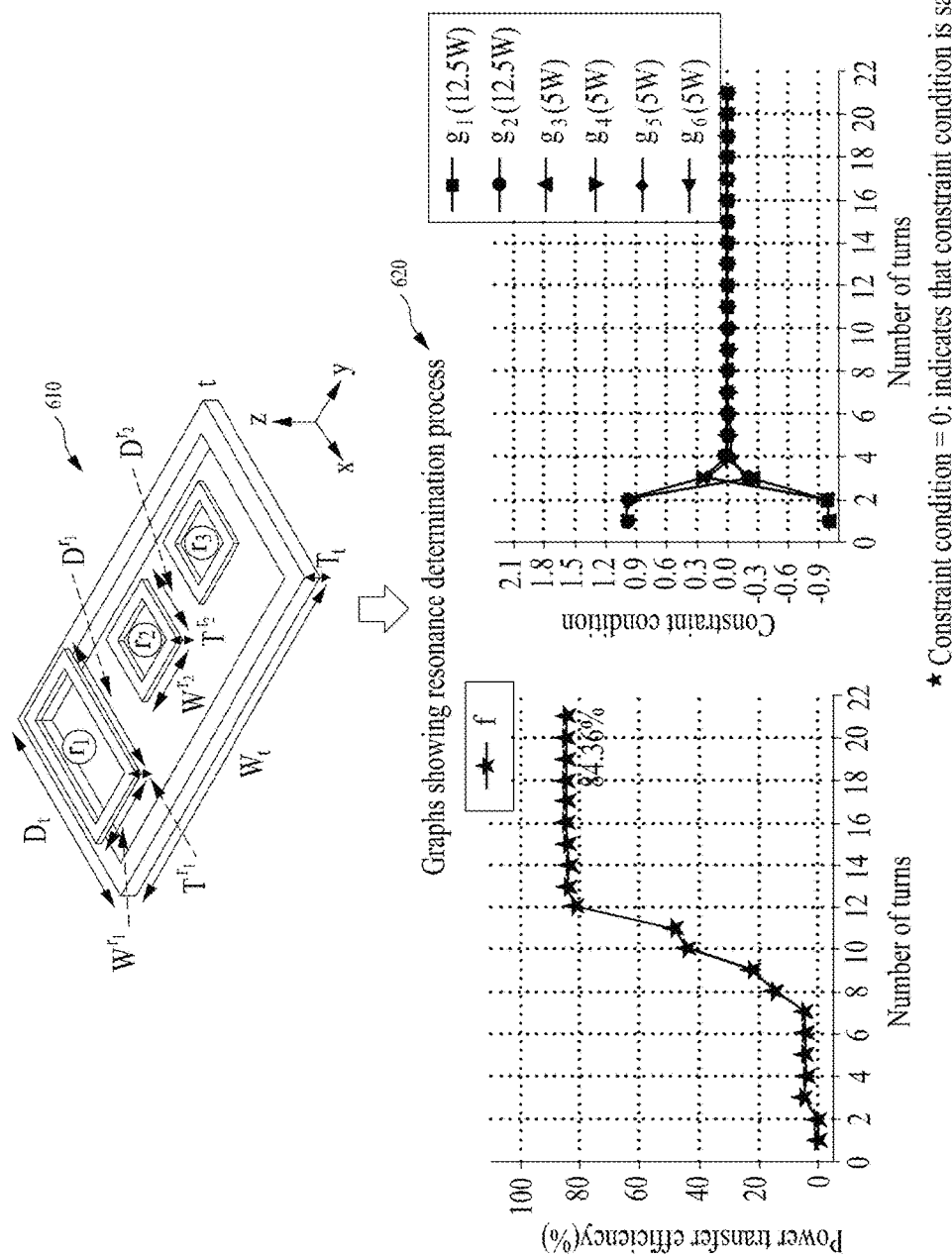
FIG. 6 illustrates an example of determining a resonant condition for a multi-transmitter/receiver wireless power transfer system using a magnetic resonant condition determining method according to an example embodiment.

FIG. 6 illustrates an example of determining a resonant condition for a multi-transmitter/receiver wireless power transfer system using a magnetic resonant condition determining method according to an example embodiment. FIG. 6 illustrates a multi-transmitter/receiver wireless power transfer system 610 and graphs 620 showing a resonance determination process for the multi-transmitter/receiver wireless power transfer system 620. Here, a resonance determination result may be represented as the following Table 2.

TABLE 2

| design variable | transmitter capacitance $C_t$ | $r_1$ receiver capacitance $C^{r1}$ | $r_2$ receiver capacitance $C^{r2}$ | $r_3$ receiver capacitance $C^{r3}$ | input voltage $V_t$ |
|---|---|---|---|---|---|
| resonance determination result value | 9.71 nF | 33.93 nF | 90.85 nF | 74.68 nF | 16.68 V |

| system performance | transmitter rated power $P_t$ | $r_1$ receiver rated power $P^{r1}$ | $r_2$ receiver rated power $P^{r2}$ | $r_3$ receiver rated power $P^{r3}$ | power transfer efficiency $\eta_{total}$ |
|---|---|---|---|---|---|
| | 27.57 W | 12.81 W | 4.93 W | 5.12 W | 84.36% |

The wireless power transfer system having a multi-transmitter/receiver may have different rated power with respect to an individual receiver. The example embodiments may satisfy different rated power for each receiver and also maximize the power transfer efficiency by assigning a constraint condition about the rated power of the individual receiver. For example, to verify an application result about a multi-transmitter/receiver, a computer apparatus that performs a magnetic resonant condition determining method according to an example embodiment may measure, for example, power transfer efficiency and rated power of a target system with varying each of an operating frequency, a compensation capacitance, and an input voltage by a preset magnitude.

Figure 7A:
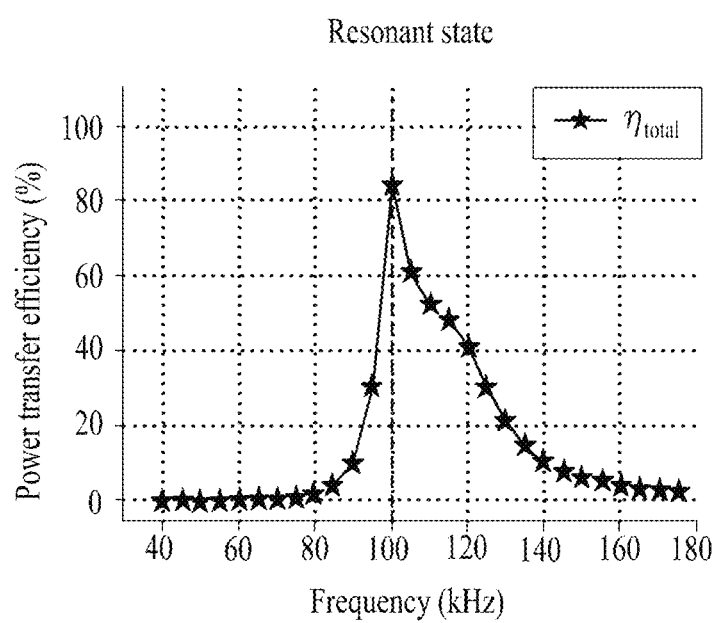
FIGS. 7A, 7B, 8A, 8B, 9A, 9B, 10A, 10B, 11A, 11B, 12A and 12B illustrate examples of verifying that a power transfer efficiency is maximized and rated power is met from graphs showing a change in a parameter of a design variable and a frequency in a resonant condition set using a magnetic resonant condition determining method according to an example embodiment.
Figure 7B:
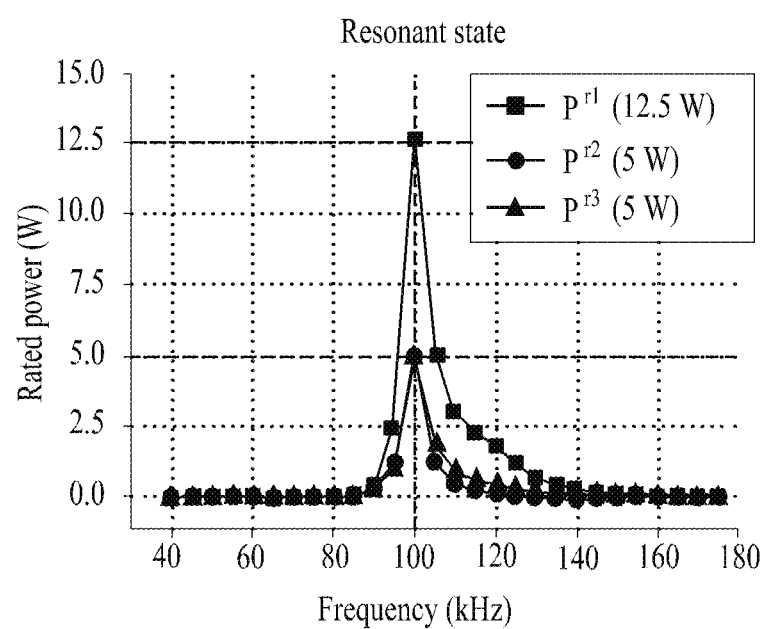
Figure 8A:
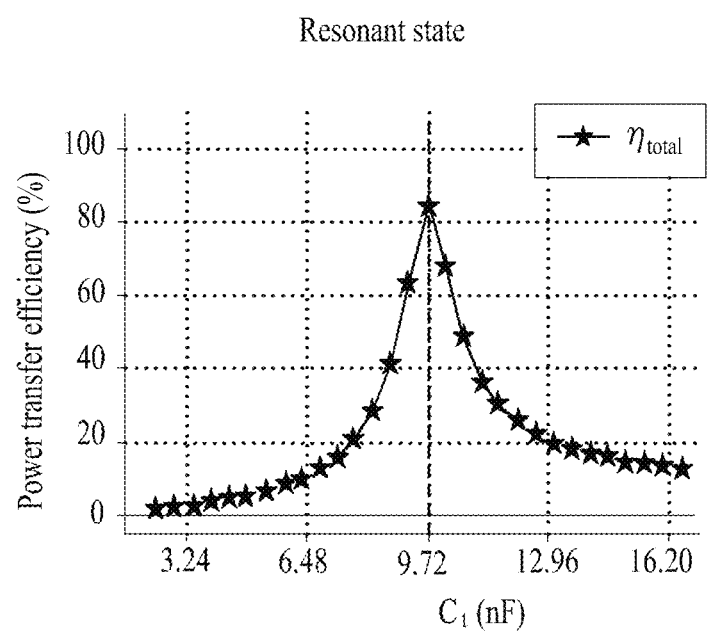
Figure 8B:
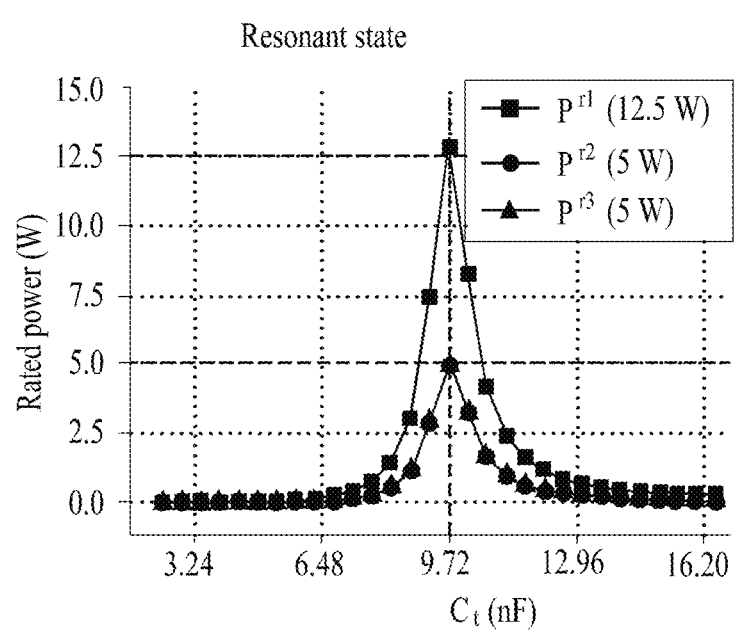
Figure 9A:
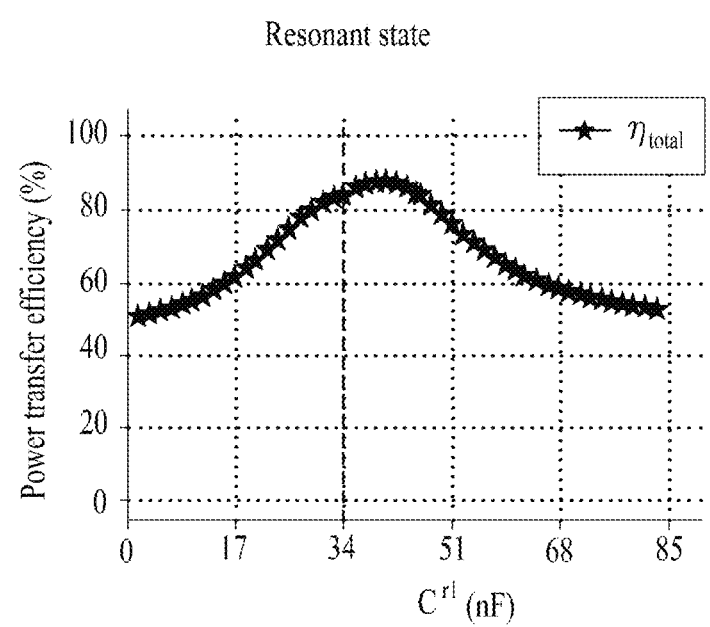
Figure 9B:
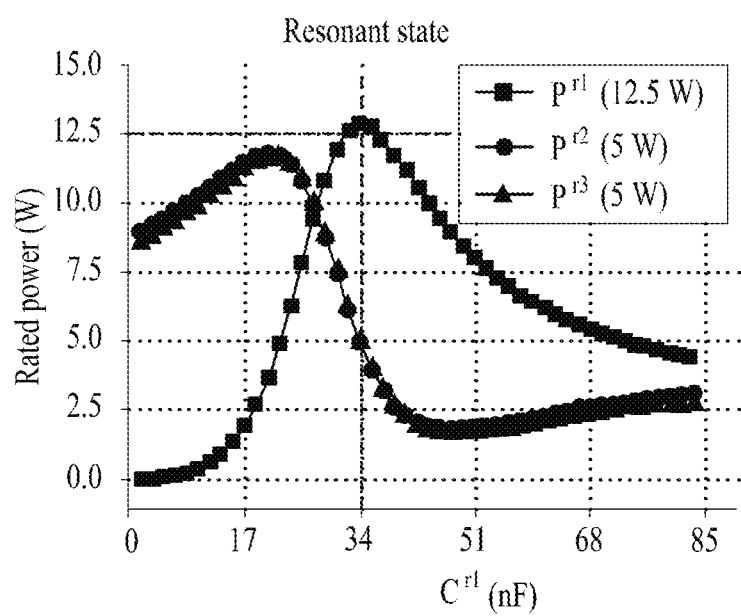
Figure 10A:
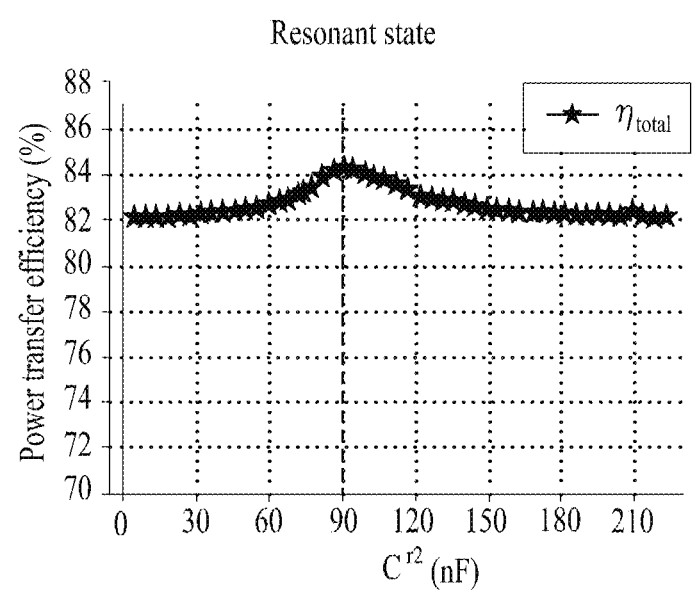
Figure 10B:
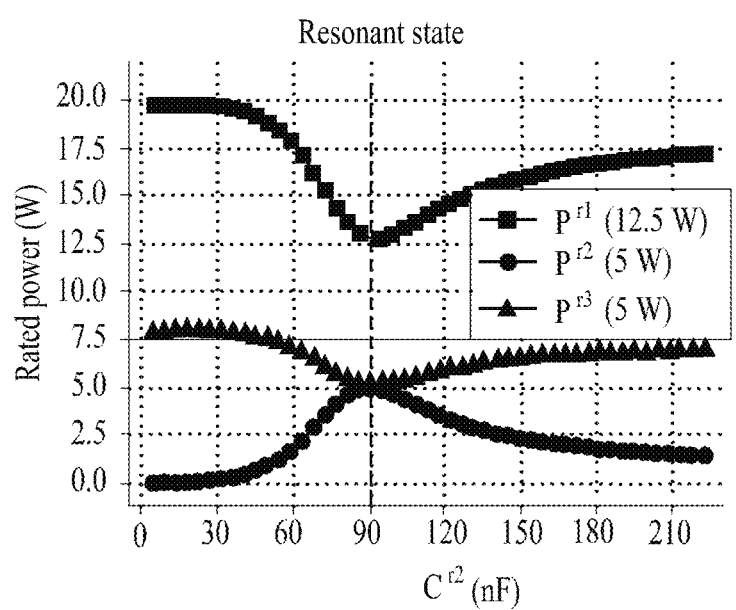
Figure 11A:
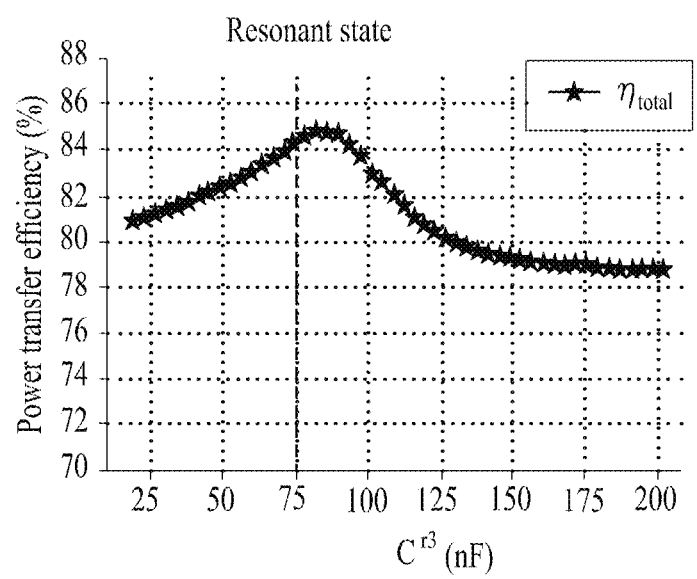
Figure 11B:
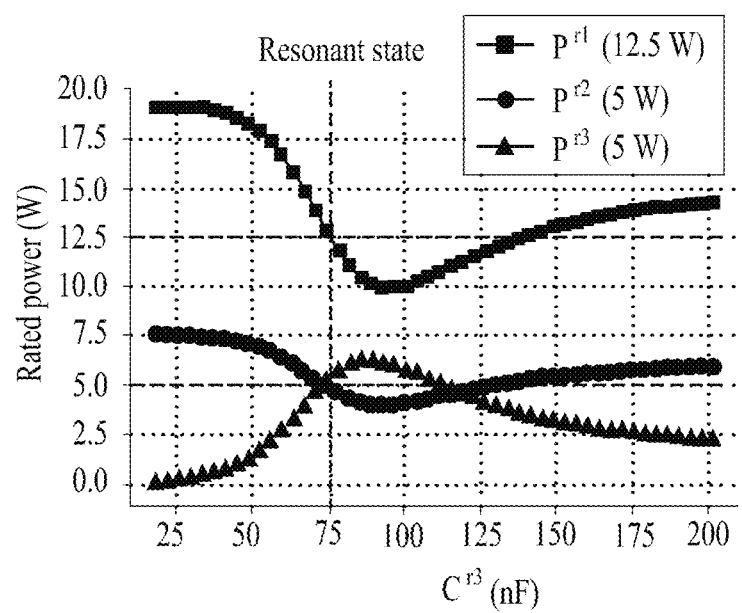
Figure 12A:
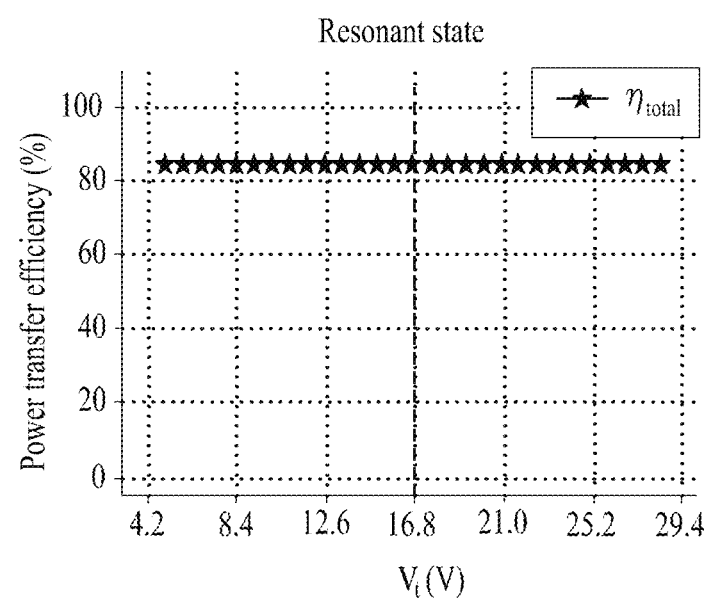
Figure 12B:
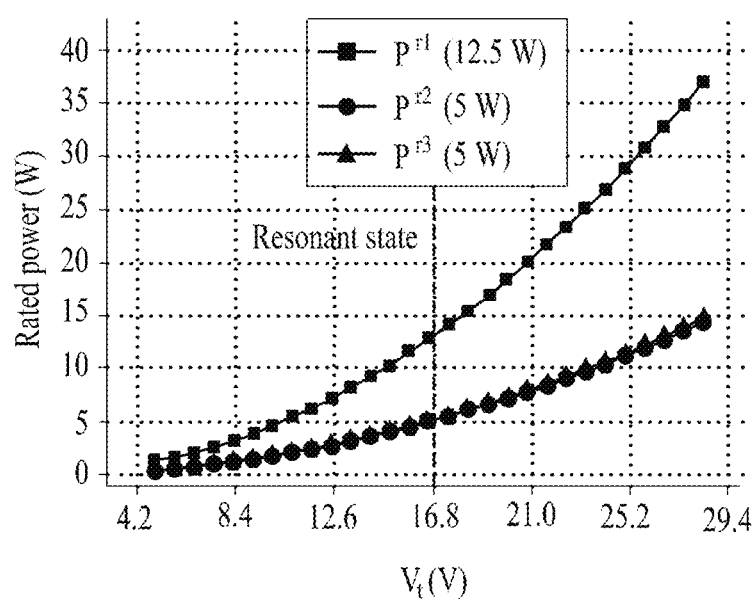

FIGS. 7A, 7B, 8A, 8B, 9A, 9B, 10A, 10B, 11A, 11B, 12A and 12B illustrate examples of verifying that a power transfer efficiency is maximized and rated power is met from graphs showing a change in a parameter of a design variable and a frequency in a resonant condition set using a magnetic resonant condition determining method according to an example embodiment. In the graphs, a resonant state may indicate a state in which the rated power is met and the power transfer efficiency is maximized. That is, in the graphs of FIGS. 7A, 7B, 8A, 8B, 9A, 9B, 10A, 10B, 11A, 11B, 12A and 12B, vertical dotted lines represent a resonant condition that is derived through the magnetic resonant condition determining method according to the example embodiment. Here, the graphs of FIGS. 7A, 7B, 8A, 8B, 9A, 9B, 10A, 10B, 11A, 11B, 12A and 12B show that resonant conditions derived through the magnetic resonant condition determining method satisfy all of the individual rated power and maximize the power transfer efficiency. For example, the graphs of FIGS. 7A and 7B show that the power transfer efficiency and the rated power are maximized at a frequency of 100 kHz.

Redetermination resonant condition in which a varied charging environment is reflected and correction During an operation of the multi-transmitter/receiver wireless power transfer system, a relative position between a transmitter and a receiver, a number of transmitters/receivers, rated power of a receiver, and a type may vary.

Figure 13A:
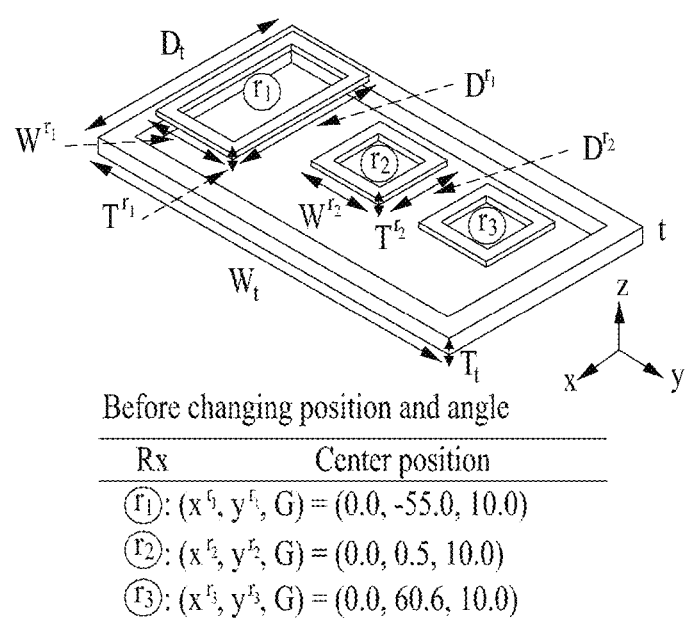
FIGS. 13A and 13B illustrate examples of a change in charging performance including a power transfer efficiency due to a misalignment of charging devices according to an example embodiment.
Figure 13B:
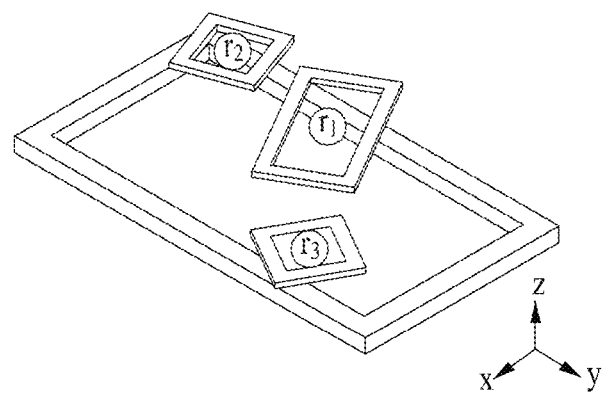

FIGS. 13A and 13B illustrate examples of a change in charging performance including power transfer efficiency due to a misalignment of charging devices according to an example embodiment. In response to such a change in a charging environment, the coupling effect between transmitting and receiving coils and the required rated power of a receiver may vary and a resonant condition may vary accordingly. Without correcting the resonant condition that is changed in response to the change in the environment, the required rated power of the receiver may not be satisfied and the power transfer efficiency may be significantly degraded. According to example embodiments, the resonant condition about the changed environment may be redetermined and resonance compensation may be performed by reflecting the redetermined resonant condition. The following Table 3 shows a mutual inductance change between a transmitter and a receiver and Table 4 shows a change in system performance.

TABLE 3

| mutual inductance | before changing position and angle | after changing position and angle |
|---|---|---|
| (uH) b/w t – $r_1$ | 17.44 | 12.12 |
| (uH) b/w t – $r_2$ | 5.66 | 5.47 |
| (uH) b/w t – $r_3$ | 6.72 | 5.27 |
| (uH) b/w $r_1$ – $r_2$ | −0.57 | −0.72 |
| (uH) b/w $r_1$ – $r_3$ | −0.08 | −0.35 |
| (uH) b/w $r_2$ – $r_3$ | −0.32 | −0.02 |

TABLE 4

| system performance | before changing position and angle | after changing position and angle | change rate (%) |
|---|---|---|---|
| transmitter rated power $P_t$ (W) | 27.57 | 36.43 | 32.14 |
| $r_1$ receiver rated power $P^{r1}$ (W) | 12.81 | 8.67 | 32.32 |
| $r_2$ receiver rated power $P^{r2}$ (W) | 4.93 | 5.49 | 11.36 |
| $r_3$ receiver rated power $P^{r3}$ (W) | 5.12 | 10.91 | 113.09 |
| power transfer efficiency $\eta_{total}$ (%) | 84.36 | 68.82 | 18.42 |

Figure 14:
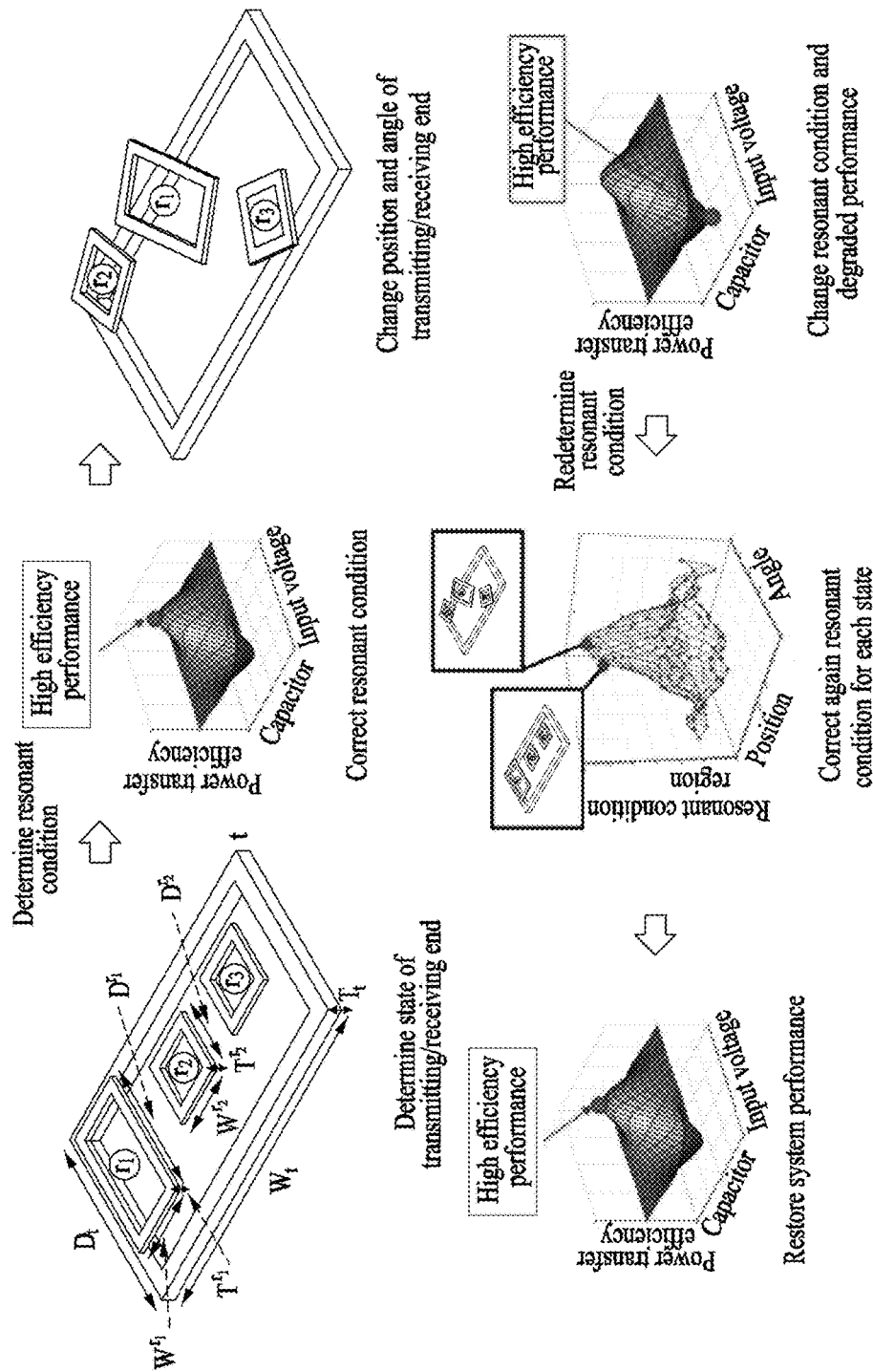
FIG. 14 illustrates an example of redetermining a resonant condition in response to a change in a position and an angle of a multi-transmitter/receiver and performing a resonance compensation according to an example embodiment.

FIG. 14 illustrates an example of redetermining a resonant condition in response to a change in a position and an angle of a multi-transmitter/receiver and performing a resonance compensation according to an example embodiment. For example, in response to detecting a degradation in performance by a change in a resonant condition, the computer apparatus according to the example embodiment may redetermine the resonant condition for each state through the magnetic resonant condition determining method according to the example embodiment and may provide the redetermined resonant condition, thereby restoring the performance of the multi-transmitter receiver wireless power transfer system.

That is, the example embodiments may overcome the degradation in the system performance occurring due to, for example, a change in a relative position between a transmitter and a receiver and accordingly, may increase a degree of freedom of a charge state for the multi-transmitter/receiver, for example, a position and an angle of each of transmitters/receivers.

Figure 15:
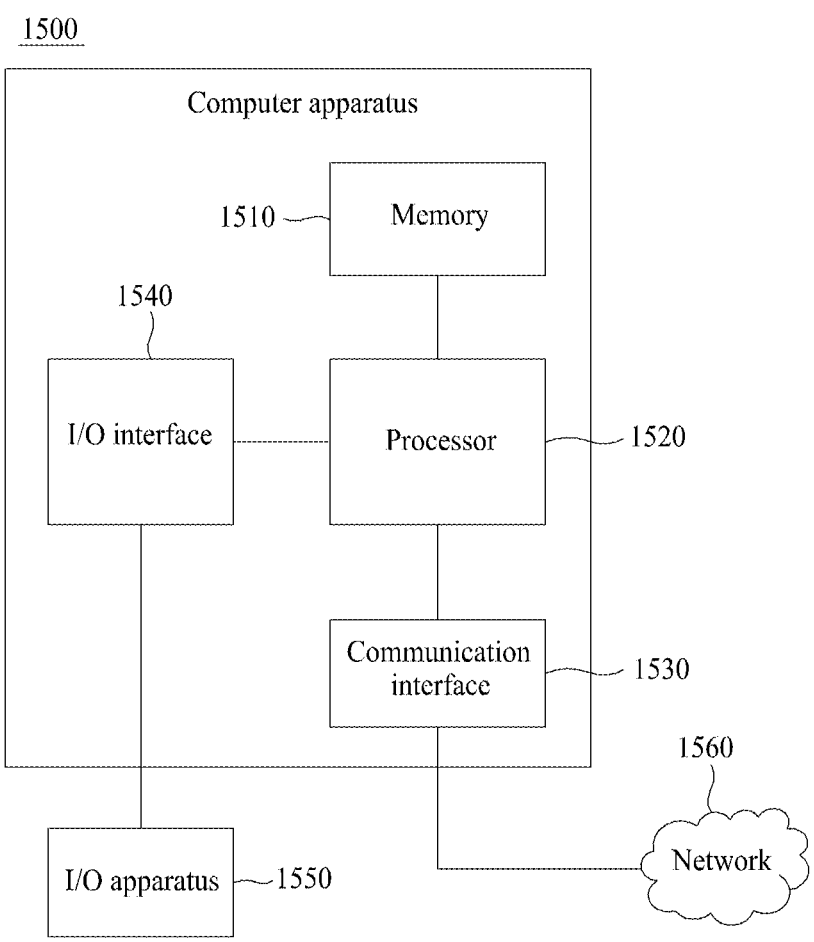
FIG. 15 is a diagram illustrating an example of a configuration of a computer apparatus according to an example embodiment.

FIG. 15 is a diagram illustrating an example of a configuration of a computer apparatus according to an example embodiment. Referring to FIG. 15, a computer apparatus 1500 may include a memory 1510, a processor 1520, a communication interface 1530, and an input/output (I/O) interface 1540. The memory 1510 may include a permanent mass storage device, such as random access memory (RAM), read only memory (ROM), and disk drive. Here, the permanent mass storage device, such as ROM and disk drive, may be included in the computer apparatus 1500 as a permanent storage device separate from the memory 1510. Also, an OS and at least one program code may be stored in the memory 1510. Such software components may be loaded to the memory 1510 from another non-transitory computer-readable storage medium separate from the memory 1510. The other non-transitory computer-readable storage medium may include a non-transitory computer-readable recording medium, for example, a floppy drive, a disk, a tape, a DVD/CD-ROM drive, a memory card, etc. According to other example embodiments, software components may be loaded to the memory 1510 through the communication interface 1530, instead of, or in addition to, the non-transitory computer-readable storage medium. For example, software components may be loaded to the memory 1510 of the computer apparatus 1500 based on a computer program installed by files received over a network 1560.

The processor 1520 may be configured to process computer-readable instructions of a computer program by performing basic arithmetic operations, logic operations, and I/O operations. The computer-readable instructions may be provided from the memory 1510 or the communication interface 1530 to the processor 1520. For example, the processor 1520 may be configured to execute received instructions in response to a program code stored in a storage device, such as the memory 1510.

The communication interface 1530 may provide a function for communication between the computer apparatus 1500 and another apparatus, for example, the aforementioned storage device, over the network 1560. For example, the processor 1520 of the computer apparatus 1500 may transfer a request or an instruction, data, a file, etc., created based on the program code stored in the storage device such as the memory 1510, to other devices over the network 1560 under control of the communication interface 1530. Inversely, a signal, an instruction, data, a file, etc., from another apparatus may be received at the computer apparatus 1500 by going through the communication interface 1530 of the computer apparatus 1500 and the network 1560. For example, a signal, an instruction, data, etc., received through the communication interface 1530 may be transferred to the processor 1520 or the memory 1510, and content, a file, etc., may be stored in a storage medium, for example, the aforementioned permanent storage device, further includable in the computer apparatus 1500.

The I/O interface 1540 may be a device used for interface with an I/O apparatus 1550. For example, an input device may include a device, such as a microphone, a keyboard, and a mouse, and an output device may include a device, such as a display and a speaker. As another example, the I/O interface 1540 may be a device for interface with an apparatus in which an input function and an output function are integrated into a single function, such as a touchscreen. The I/O apparatus 1550 may be configured as a single apparatus with the computer apparatus 1500.

According to other example embodiments, the computer apparatus 1500 may include a greater or less number of components than a number of components shown in FIG. 15. However, there is no need to clearly illustrate many components according to the related art. For example, the computer apparatus 1500 may include at least a portion of the I/O apparatus 1550, or may further include other components, for example, a transceiver, a database (DB), and the like.

Figure 16:
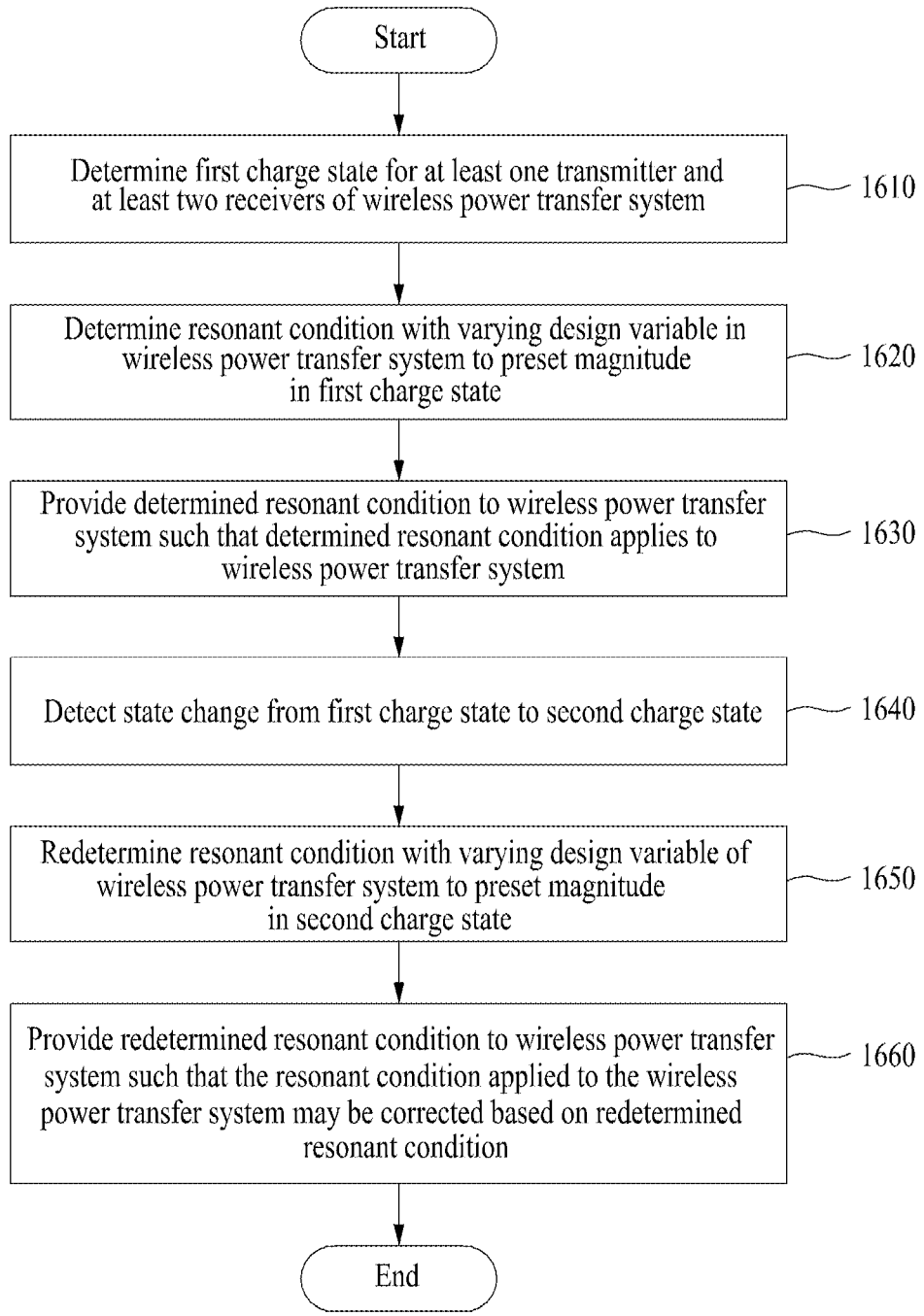
FIG. 16 is a flowchart illustrating an example of a magnetic resonant condition determining method according to an example embodiment.

FIG. 16 is a flowchart illustrating an example of a magnetic resonant condition determining method according to an example embodiment. The magnetic resonant condition determining method of FIG. 16 may be performed by the aforementioned computer apparatus 1500. For example, the processor 1520 of the computer apparatus 1500 may be configured to execute a control instruction according to a code of at least one program or a code of an OS included in the memory 1510. Here, the processor 1520 may control the computer apparatus 1500 to perform operations 1610 to 1660 included in the method of FIG. 16 in response to the control instruction provided from the code stored in the computer apparatus 1500.

Referring to FIG. 16, in operation 1610, the computer apparatus 1500 may determine an initial charge state, for example, a first charge state for at least one transmitter and at least two receivers of a wireless power transfer system. Here, a charge state for a transmitter and a receiver may be determined based on at least one of a number of transmitters of the wireless power transfer system, a number of receivers that are supplied with wireless power through the wireless power transfer system, a charge capacity of a receiver, a relative position between a transmitter and a receiver, and an orientation angle of a receiver being charged.

In operation 1620, the computer apparatus 1500 may determine a resonant condition with varying a design variable in the wireless power transfer system by a preset magnitude in the initial charge state, for example, the first charge state. For example, the design variable may include at least one parameter among an operating frequency, a compensation capacitance, and an input voltage. For example, as shown in the graphs of FIGS. 7A to 12B, the computer apparatus 1500 may acquire a value of a parameter when a resonant condition is met, with varying parameters, such as, for example, the operating frequency, the compensation capacitance, and the input voltage, by a preset magnitude. Here, the resonant condition may include a value of a least one parameter that satisfies the charge capacity of each of the at least two receivers and also maximizes the power transfer efficiency. For example, the resonant condition may include at least one of a value of the operating frequency, a value of the compensation capacitance, and a value of the input voltage that simultaneously satisfy the charge capacity and maximize the power transfer efficiency.

In operation 1630, the computer apparatus 1500 may provide the determined resonant condition to the wireless power transfer system such that the determined resonant condition applies to the wireless power transfer system. The wireless power transfer system may satisfy the resonant condition by setting at least one of the operating frequency, the compensation capacitance, and the input voltage based on the provided condition, for example, at least one of the value of the operating frequency, the value of the compensation capacitance, and the value of the input voltage.

In operation 1640, the computer apparatus 1500 may detect a state change from the initial charge state, for example, the first charge state, to another charge state, for example, a second charge state. For example, the computer apparatus 1500 may detect the state change by detecting a change in at least one of a number of transmitters of the wireless power transfer system, a number of receivers that are supplied with wireless power through the wireless power transfer system, a charge capacity of a receiver, a relative position between a transmitter and a receiver, and an orientation angle of a receiver being charged. Here, the change may be detected based on an output value of a sensor included in the wireless power transfer system. In detail, the wireless power transfer system may include sensors for sensing the number of transmitters of the wireless power transfer system, the number of receivers that are supplied with the wireless power through the wireless power transfer system, a charge capacity of a receiver, a relative position between a transmitter and a receiver, and an orientation angle of a receiver being charged. The computer apparatus 1500 may detect the at least one change from output values of the sensors included in the wireless power transfer system. For example, any type of sensors capable of sensing a number of receivers provided at a charging position, a relative position thereof, and an orientation angle thereof, or capable of sensing a change in the number of receivers, the relative position, and the orientation angle, such as a proximity sensor, a pressure sensor, and/or a motion sensor, may be used for the sensors disclosed herein.

In operation 1650, the computer apparatus 1500 may redetermine the resonant condition with varying the design variable of the wireless power transfer system by the preset magnitude in the other charge state, for example, the second charge state. As described above, a change in the charge state may cause a change in the resonant condition due to a change in a coupling effect between a transmitter and a receiver and a change in required rated power of a receiver.

Accordingly, the computer apparatus 1500 may redetermine the resonant condition in response to the change in the charge state. The design variable may include at least one parameter among the operating frequency, the compensation capacitance, and the input voltage.

In operation 1660, the computer apparatus 1500 may provide the redetermined resonant condition to the wireless power transfer system such that the resonant condition applied to the wireless power transfer system may be corrected based on the redetermined resonant condition. The wireless power transfer system may correct the applied resonant condition based on the redetermined resonant condition and may restore the performance degraded by the state change.

Although an example of correcting a resonant condition by redetermining the resonant condition in response to a state change from an initial charge state to another charge state is described with reference to FIG. 16, correcting the resonant condition may be performed every time the charge state varies.

Meanwhile, as described above, the computer apparatus 1500 may be configured to be included in the wireless power transfer system or may be configured as an apparatus separate from the wireless power transfer system and to communicate with the wireless power transfer system over a network. For example, the computer apparatus 1500 may be configured to be included in the wireless power transfer system and directly vary at least one parameter by a preset magnitude, and, depending on example embodiments, may be configured to control the wireless power transfer system to vary at least one parameter by the preset magnitude through communication with the wireless power transfer system.

Application and Applicable Field (a) Wireless Charging an Electrical Vehicle During Parking Due to environmental issues, interest and demand for electrical vehicles are currently on the exponential increase. If wireless power transfer technology applies to a charging system of an electrical vehicle, the electrical vehicle may be charged simply with parking in a designated place. Accordingly, the convenience and stability of a driver may be significantly enhanced. If example embodiments apply to the charging system of the electrical vehicle, charging infrastructure, for example, an inverter and a converter, may be efficiently used at the time of simultaneously charging a plurality of electrical vehicles. In particular, if a charging environment changes due to a change in the number of vehicles being charged or a misalignment, it is possible to redetermine a resonant condition and to perform a correction by applying the change to the charging environment.

(b) Wireless Charging a Drone

Currently, a drone is used in various fields, for example, delivery, shooting, and extinguishing a fire. However, an operation time of the drone is limited due to, for example, a battery capacity. To use the drone in a stable manner, a charging place is required in a transit region. If an autonomous driving and wireless charging is linked, the drone may be further effectively operated. Here, the drone may not stably land at a charging point depending on a weather condition. According to the example embodiments, it is possible to effectively cope with an issue caused by inconsistency at a landing.

(c) Available to Various Products, Such as an Unmanned Product and a Mobile Device of a User.

The example embodiments may be used for various unmanned and wireless electronic products, for example, an unmanned cleaner, an unmanned logistics robot, a mobile phone, a tablet PC, a wireless keyboard, and a mouse.

Although the existing magnetic resonance type wireless power transfer research has been conducted based on a system including a single transmitter/receiver, the example embodiments may be readily expandable to a multi-transmitter/receiver magnetic resonance type system about the existing studies. Here, in the case of construing the multi-transmitter/receiver magnetic resonance type system, power may be supplied to a plurality of receivers using a single transmitter or a small number of transmitters. Accordingly, it is possible to save cost used for constructing infrastructure and to enhance a transmission distance through magnetic resonance. Also, in the case of combining autonomous driving technology and wireless power transfer technology according to the example embodiments, power supply may be performed effectively and stably, which may lead to expanding the technical ability and marketability of unmanned products, such as, for example, an unmanned cleaner and a logistics robot.

According to some example embodiments, it is possible to determine a resonant condition based on a charge state, for example, a number of charging devices and a relative position between charging devices, for a multi-transmitter/receiver of a wireless power transfer system. Also, it is possible to support a wireless power transfer system to stably and efficiently transfer wireless power by determining a new resonant condition in response to a change in a resonant condition, such as a change of a charge state, for example, a number of charging devices and a relative position between charging devices, for a multi-transmitter/receiver of the wireless power transfer system, and by performing a resonance compensation through application of the determined new resonant condition.

The apparatuses described herein may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tapes; optical media such as CD-ROM discs, and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of determining a magnetic resonant condition for a wireless power transfer system capable of performing a wireless power transfer using at least two receivers, the method comprising:
   determining a single initial charge state for at least one transmitter and the at least two receivers of the wireless power transfer system based on a transmitter rated power of the at least one transmitter and a receiver rated power for each of the at least two receivers; and
   determining a resonant condition between each of the at least one transmitter and each receiver with varying at least one design variable in the wireless power transfer system by a preset magnitude in the single initial charge state that maximizes a power transfer efficiency of the wireless power transfer system.

2. The method of claim 1, wherein
the at least one design variable comprises at least one parameter among an operating frequency, a compensation capacitance, and an input voltage.

3. The method of claim 1, further comprising:
   providing the determined resonant condition to the wireless power transfer system such that the determined resonant condition is applied to the wireless power transfer system.

4. The method of claim 1, further comprising:
   detecting a state change from the initial charge state to another charge state due to a change of operating conditions; and
   redetermining the resonant condition with varying at least one of an operating frequency, a compensation capacitance, and an input voltage by the preset magnitude as the at least one design variable in the wireless power transfer system, in the other charge state.

5. The method of claim 4, wherein the detecting of the state change comprises detecting a change in at least one of a number of transmitters of the wireless power transfer system, a number of receivers that are supplied with wireless power through the wireless power transfer system, a charge capacity of receivers, a relative position between a transmitter and a receiver, and an orientation angle of a receiver being charged.

6. The method of claim 5, wherein the change is detected based on an output value of a sensor included in the wireless power transfer system.

7. The method of claim 4, further comprising:
   providing the redetermined resonant condition to the wireless power transfer system such that the redetermined resonant condition is applied to the wireless power transfer system for compensation that maximizes a power transfer efficiency with satisfying a rated power of each of the at least two receivers.

8. The method of claim 1, wherein each of the at least two receivers is a charging device configured to be supplied with wireless power from the wireless power transfer system and from a source other than the wireless power transfer system.

9. A non-transitory computer-readable recording medium storing instructions that, when executed by a processor, cause the processor to perform the method of claim 1.

10. A computer apparatus that performs a method of determining a magnetic resonant condition for a wireless power transfer system capable of performing a wireless power transfer using at least two receivers, the computer apparatus comprising:
    at least one processor configured to execute a computer-readable instruction on the computer apparatus,
    wherein the at least one processor is configured to determine a single initial charge state for at least one transmitter and the at least two receivers of the wireless power transfer system based on a transmitter rated power of the at least one transmitter and a receiver rated power for each of the at least two receivers, and to determine a resonant condition between each of the at least one transmitter and each receiver with varying at least one design variable in the wireless power transfer system by a preset magnitude in the single initial charge state that maximizes a power transfer efficiency of the wireless power transfer system.

11. The computer apparatus of claim 10, wherein
the at least one design variable comprises at least one parameter among an operating frequency, a compensation capacitance, and an input voltage.

12. The computer apparatus of claim 10, wherein the at least one processor is configured to provide the determined resonant condition to the wireless power transfer system such that the determined resonant condition is applied to the wireless power transfer system.

13. The computer apparatus of claim 10, wherein the at least one processor is configured to detect a state change from the initial charge state to another charge state, and to redetermine the resonant condition with varying at least one of an operating frequency, a compensation capacitance, and an input voltage by the preset magnitude as the at least one design variable in the wireless power transfer system, in the other charge state.

14. The computer apparatus of claim 11, wherein the computer apparatus is included in the wireless power transfer system to vary the at least one parameter by the preset magnitude.

15. The computer apparatus of claim 11, wherein the computer apparatus is configured as an apparatus separate from the wireless power transfer system to control the wireless power transfer system to vary the at least one parameter by the preset magnitude through communication with the wireless power transfer system over a network.

\* \* \* \* \*